Patented May 30, 1950

2,509,499

UNITED STATES PATENT OFFICE 2,509,499

MATRIX SHEET AND PROCESS OF PREPARING SAME

Sigfried Higgins, Verona, N. J., assignor, by mesne assignments, to Union Carbide and Carbon Corporation, a corporation of New York No Drawing. Application June 26, 1947,
Serial No. 757,319

10 Claims. (Cl. 18—47.5)

This invention relates to improved thermosetting resin-fiber sheet materials and methods of preparing them, the sheets having particular utility for forming into matrices against which thermoplastic material can be molded to produce printing plates, sound records, counters and similar molded articles.

Thermosetting plastic sheet compositions particularly adapted for forming into matrices are disclosed in U. S. Patent 2,278,291 to Swan et al. The sheet compositions thereof comprise a mixture of long and short cellulose fibers bonded into a compressible mass with thermosetting phenol-aldehyde resin. A rough or matte finish is provided on at least that surface of the sheet which is to be embossed or molded by a rigid pattern to form a matrix. One method described in the patent for obtaining the matte finish is to admix with the pulp suspension of cellulose fibers and heat-hardenable resin, a considerable percentage of comminuted molding material composed of wood flour and thermosetting resin, and then forming a sheet from the admixture as specifically illustrated in Example 2. In another method, illustrated by Example 3 comminuted molding material in suspension in a volatile non-solvent liquid is sprayed or otherwise coated on the plastic sheet and then dried.

Matrices are prepared from these matte surfaced sheet compositions by hot-compression molding that side of the sheet having the matte surface against a metal or similar rigid pattern, such as type matter. Due to the combination of short and long cellulose fibers in the sheet compositions, the sheets are deeply embossed by relatively low molding pressures and the thermosetting resin in heat-hardening permanently solidifies the embossed pattern. The depressed areas of the matrix are highly polished, clean-cut replicas of the elevated areas of the rigid pattern, and the relief area of matrix in consequence of the low molding pressures are substantially uncompressed and therefore visibly retain to a considerable extent the original matte finish. Preservation of the matte finish in the relief areas of the matrix is of importance in the subsequent use of the matrix as a mold for forming molded articles such as printing plates, sound records and the like from thermoplastic material such as rubber and synthetic resins. Thermoplastic materials particularly the synthetic resins are highly fluid at molding temperatures and to direct the flow of resin primarily in a perpendicular direction in the matrix, the matte surface of the relief areas in the matrix is of advantage because it retards the lateral flow thereover of the thermoplastic material and promotes perpendicular flow into the polished depressions.

But, on the other hand, the excessive fluidity of the synthetic resins at molding temperatures creates another problem in that it makes such intimate overall contact with the matrix surface, including the rough matte relief areas, that release therefrom upon completion of the molding operation is quite difficult, unless a parting medium, namely an aqueous suspension of colloidal graphite is used, to coat the matrix surface before molding. But a graphite parting medium is not entirely satisfactory in that the molded thermoplastic articles require cleaning where the presence of graphite on their surfaces is objectionable. Furthermore, in some instances the molded matrices develop cracks in the relief areas and, despite the use of colloidal graphite, the fluid thermoplastic material readily enters the cracks and is mechanically locked and anchored upon cooling. Forcible removal of the molded thermoplastic sheet from the matrix causes the sheet to tear away with it portions of the matrix surface at the crack locations, rendering the matrix useless for further molding operations.

It has now been found that thermosetting plastic sheets, particularly those prepared with a matte surface as described in U. S. Patent No. 2,278,291 are improved with respect to elimination of surface cracks in matrices molded therefrom, and of the need for colloidal graphite or similar lubricants for securing mold release properties, when the matte surfaces of the sheets are coated with certain water-soluble thermoplastic film forming materials before they are hot-compression molded into matrix form.

Water-soluble film-forming thermoplastic materials thus useful are polyvinyl alcohol and water-soluble cellulose ethers. The term water-soluble cellulose ethers includes such products as partially alkylated cellulose ethers sufficiently etherified to be water-soluble, particularly methyl and ethyl cellulose; water-soluble hydroxy alkyl cellulose ethers, particularly hydroxy ethyl cellulose; water-soluble alkoxyalkyl ethers of cellulose for instance beta-ethoxyethyl cellulose and gamma-methoxy propylcellulose; and water-soluble alkali salts and ammonium salt of cellulose glycollic acid.

All of the aforementioned water-soluble film forming materials in aqueous solution deposit strong coherent films upon evaporation of their water content. In most instances the aqueous solutions are of low solids content (1% to 20%)

to facilitate coating application by brushing, dipping or spraying at solution viscosities of 25 to 200 centipoises. Solutions of higher solids contents are obtainable, but their extremely high viscosities make them difficult to apply as coatings to the sheet compositions by conventional means. Moreover, a thin coating as obtained with an aqueous solution of low solids content is of importance to the present invention in that the coating is not thick enough to level off the plastic sheet's rough matte surface, but merely thinly glazes each projection and depression of the matte surface with a protecting tough continuous film duplicating the topography of the matte surface.

While it would seem likely that such a coating of high tensile strength could be applied equally as well after the matrix has been formed or molded with the same attendant results of preventing cracking and dispensing with the need for parting lubricants, actually the reverse is true, because crack development in the untreated matrix surface can occur while it is being formed against or removed from the rigid pattern, and hence before it has ever been used as a mold for thermoplastic material.

It is known however that all of the thermoplastic water-soluble film-forming materials previously enumerated herein as being satisfactory for the purposes of the invention are reactive with formaldehyde and other aldehydes, the reaction products in many instances being harder and less water-soluble. It is also known that thermosetting phenol formaldehyde resins tend to release free formaldehyde when they are heat-hardened to insolubility and infusibility. Accordingly, it is quite possible that these water-soluble film-forming materials applied to the unmolded plastic sheet containing a thermosetting phenol-aldehyde resin binder are subsequently reacted or altered to a favorable extent by formaldehyde released from the resinous binder when the plastic sheet is hot-compression molded against a rigid pattern.

Although good results are obtained by coating the matte surfaces of unmolded thermosetting sheet compositions, an alternative procedure which can be used in the instance of those sheets given a matte surface by coating with a suspension of comminuted thermosetting molding material is to combine the matte coating step with the film-forming coating step; by applying in one operation a coating composition comprising comminuted thermosetting molding material suspended in an aqueous solution of polyvinyl alcohol or water-soluble cellulose ether. But with this method a larger amount of water-soluble thermoplastic film-forming material must be used to obtain a continuous overlying top film of the thermoplastic material on the matte surface of the plastic sheet. Furthermore, thermosetting plastic sheets not provided with a matte surface produced by a coating of comminuted thermosetting molding material can also be improved with respect to release properties when they are coated with the herein described water-soluble thermoplastic film forming materials before they are hot-compression molded.

By way of illustration the following examples are descriptive of the preparation of coated resin fiber sheet compositions suitable for forming into matrices resistant to surface cracking and having per se good release properties from thermoplastic materials molded thereon.

*Example 1*

A thermosetting resin-fiber sheet composition was prepared with a matte surface as described in Example 3 of U. S. Patent 2,278,291. That surface of the sheet coated with molding material fines was then further coated with a 4 percent aqueous solution of polyvinyl alcohol (solution viscosity, 20 centipoises at 20° C.) applied by brushing. The polyvinyl alcohol coating was air dried at room temperatures overnight. The dried coating had an overall diffused shine rather than a glossy specular luster because the low solids contents of the polyvinyl alcohol solution enabled only a thin continuous duplicating film to be deposited over the rough matte surface of the sheet composition, thereby retaining to a substantial visible extent the original roughness and its advantages for controlling plastic flow of thermoplastic materials molded thereon in the subsequent use of the sheet as a matrix material. The coated side of the sheet was compression molded against a pattern plate, for instance an electrotype at a continuous molding pressure of approximately 100 p. s. i. and molding temperature between 135° C. and 150° C. for ten minutes. Higher molding pressures can be used where better definition is required in the matrix. The resultant molded matrix sheet accurately reproduced as depressed areas on its surface, the elevated areas of the pattern plate. The relief areas of the matrix retained substantially the original rough glazed finish and the entire surface of the sheet was free of cracks or crevices. Printing plates of vinyl acetate-vinyl chloride copolymer resin were struck from the matrix by compression molding granules of the copolymer resin against the matrix at a pressure of about 1000 p. s. i. and temperature between 135° C. and 150° C. The press and its contents were then cooled to below the softening temperature of the copolymer resin before being opened. The resultant fused sheet of copolymer resin was easily manually released from the matrix without tearing or picking off of any part of the matrix surface.

*Example 2*

A thermosetting resin-fiber sheet composition was prepared as described in Example 2 of U. S. Patent 2,278,291 whereby a matte surface on each side of the sheet was produced from the presence of a large amount of molding material fines added to the resin pulp mixture, before forming into a sheet. One side of the sheet was brush coated with a 10 per cent aqueous solution of hydroxyethyl cellulose (5% solution viscosity, 100 centipoises at 20° C.). The coating was air dried overnight. The original dull matte finish of the sheet composition was changed by the dried hydroxyethyl cellulose coating to a glazed but still rough finish. A matrix was formed of the coated sheet by compression molding it against an electrotype as in the previous example. The matrix surface was free of surface cracks and retained a matte surface on all relief areas. The depressed areas of the matrix were superior in fidelity of reproduction than those of the previous example. Various thermoplastic materials such as polyvinyl chloride, vinyl acetate-vinyl chloride copolymer resin, polystyrene-acrylonitrile copolymer, polystyrene, polymethyl methacrylate, polyethylene, and plasticized cellulose acetate were compression molded against the matrix and upon cooling released easily, unattended by any adherence to the matrix sufficient to cause picking off of material from its surface.

Example 3

A thermosetting resin-fiber sheet prepared as described in Example 1 of U. S. Patent 2,278,291 was spray coated with an aqueous suspension consisting of approximately forty parts by weight of thermosetting molding material fines and 60 parts of a 10 per cent aqueous solution of hydroxyethyl cellulose having a viscosity of 103 centipoises at 20° C.

The coating was forced dried by heating it in an oven for one hour at a temperature of 45° C. The resultant coating was not as shiny as that of Example 2 and tended to blister more in areas not subjected to molding pressure, but matrices compression molded from the coated sheet released as readily from thermoplastic material molded thereover as did the matrix sheets of Examples 1 and 2. Moreover the coating was more water resistant to accidental wetting than that of Examples 1 and 2.

Example 4

A thermosetting resin fiber sheet was prepared as described in Example 1 of U. S. Patent 2,278,291 and then spray coated with a 10 per cent aqueous solution of hydroxyethyl cellulose having a viscosity of 100 centipoises at 20° C. The coating was air dried at room temperature for 20 hours, imparting a glazed surface to the sheet. Matrices duplicating an electrotype were hot-compression molded from the sheet but the definition was not as sharp as with the matrices of the previous examples. However, the matrices released readily from thermoplastic materials molded thereon to form printing plates.

In compression molding the coated resin-fiber sheets against a pattern, the molding press when once closed should not be opened again during the curing cycle for breathing purposes, by which is meant the customary practice of momentarily opening a mold to release volatiles such as water vapor, formaldehyde, phenol and other vaporous matter which are formed or given off by thermosetting resins when heat converted to infusible polymers. It has been found that the described coatings of water-soluble thermoplastic material which have been forced dried at elevated temperatures, so effectively seal the sheet's top surface, that volatile matter does not rapidly diffuse therethrough but tends to blister the coating at the relief areas unless the sheet is maintained under continuous pressure throughout the molding operation until the thermosetting resinous binder is fully heat hardened. Even though the press must be kept closed, volatiles can nevertheless escape at the open and unconfined edges of the sheet because in this type of compression molding the edges of sheets are not subjected to lateral pressure or confinement.

The permeability or porosity of superimposed water-soluble thermoplastic coatings for more rapidly releasing or diffusing volatile matter during the compression molding of the coated sheet can be favorably increased by drying the coatings until non-tacky at low to moderate temperatures, for instance between 5 and 38° C. This method of drying is of particular advantage in the instance of sheets which have been simultaneously coated with water-soluble thermoplastic polymer and molding material fines as illustrated in Example 3. Sheets which have been thus coated but dried at low to moderate temperatures instead of being baked at 45° C. and higher temperatures, are so permeable that they can be compression molded, and the press opened momentarily for breathing purposes without blisters forming on any portion of the coated surfaces.

The foregoing examples have illustrated the application of top coatings of individual water-soluble cellulose ethers or polyvinyl alcohol, however compatible mixtures of these coatings can also be used if desired. For instance hydroxyethylcellulose is partially compatible with sodium carboxymethyl cellulose or polyvinyl alcohol. Such coating mixtures produce practically the same effect however as either of its individual components on the resin-fiber sheet as regards release properties and resistance to cracking of the matrix surface.

What is claimed is:

1. Composition suitable for matrix manufacture comprising in sheet form a fibrous base having a thermosetting phenol-aldehyde resinous binder incorporated therewith and a surface coating on said base of a water-soluble thermoplastic substance selected from the group consisting of polyvinyl alcohol and cellulose ethers.

2. Composition suitable for matrix manufacture comprising in sheet form a fibrous base containing cellulose fibers, a thermosetting phenol-aldehyde resinous binder incorporated with the fibers, and comminuted thermosetting molding material, said sheet having a matte surface coated with a water-soluble thermoplastic substance selected from the group consisting of polyvinyl alcohol and cellulose ethers.

3. Composition suitable for matrix manufacture comprising in sheet form a fibrous base containing cellulose fibers, a thermosetting phenol-aldehyde resinous binder incorporated with the fibers, a surface coating comprising a dried suspension of thermosetting molding material fines and a superimposed adherent coating of a water-soluble thermoplastic substance selected from the group consisting of polyvinyl alcohol and cellulose ethers.

4. Composition suitable for matrix manufacture comprising in sheet form a fibrous base containing cellulose fibers, a thermosetting phenol-aldehyde resinous binder incorporated with the fibers and a surface coating comprising a dried suspension of thermosetting molding material fines and a water-soluble thermoplastic substance selected from the group consisting of polyvinyl alcohol and cellulose ethers.

5. Composition suitable for matrix manufacture comprising in sheet form a fibrous base containing cellulose fibers, a surface coating of a dried suspension of thermosetting molding material fines and a superimposed coating of hydroxyethyl cellulose.

6. Method of preparing a matrix sheet resistant to surface cracking and readily releasing from thermoplastic molding material, which comprises applying an aqueous solution of a water-soluble thermoplastic substance selected from the group consisting of polyvinyl alcohol and cellulose ethers onto the surface of a fibrous sheet bonded with a thermosetting phenol-aldehyde resin, drying the coating, and then compression molding the sheet against a pattern.

7. Method of preparing a matrix sheet resistant to surface cracking which comprises applying to the surface of a fibrous sheet having a thermosetting phenol-aldehyde resinous binder a coating composition comprising comminuted thermosetting molding material in suspension in an aqueous solution of a water-soluble thermoplastic substance selected from the group consisting of polyvinyl alcohol and cellulose ethers, drying the coating, and then compression molding the coated surface against a pattern.

8. Method of preparing a matrix sheet resistant to surface cracking which comprises coating the surface of a fibrous sheet having a thermosetting phenol-aldehyde resinous binder with an aqueous solution of hydroxyethyl cellulose, drying the coating, and then compression molding the coated surface against a pattern.

9. Method of preparing a fibrous sheet resistant to surface cracking and blister formation when compression molded against a pattern, which comprises coating a thermosetting phenol-aldehyde resin bonded fibrous sheet with an aqueous solution of a water-soluble thermoplastic substance selected from the group consisting of polyvinyl alcohol and cellulose ethers, and then drying the coating at a temperature between 5° and 38° C.

10. A crack-resistant matrix compression molded from a fibrous sheet containing cellulose fibers and a thermosetting phenol-aldehyde resinous binder, said sheet having a dried surface coating of a water-soluble thermoplastic material selected from the group consisting of polyvinyl alcohol and cellulose ethers.

SIGFRIED HIGGINS.

REFERENCES CITED

The following references are of record in the file of this patent:

UNITED STATES PATENTS

| Number | Name | Date |
| --- | --- | --- |
| 2,123,155 | Groff | July 5, 1938 |
| 2,198,621 | Izard | Apr. 30, 1940 |
| 2,278,291 | Swan | Mar. 31, 1942 |
| 2,328,333 | Freeman et al. | Aug. 31, 1943 |
| 2,348,677 | Freeman | May 9, 1944 |

FOREIGN PATENTS

| Number | Country | Date |
| --- | --- | --- |
| 484,343 | Great Britain | May 4, 1938 |